Jan. 9, 1923.
G. N. HEIN.
VEHICLE WINDSHIELD ATTACHMENT.
FILED APR. 26, 1922.
1,441,501.
2 SHEETS—SHEET 2.
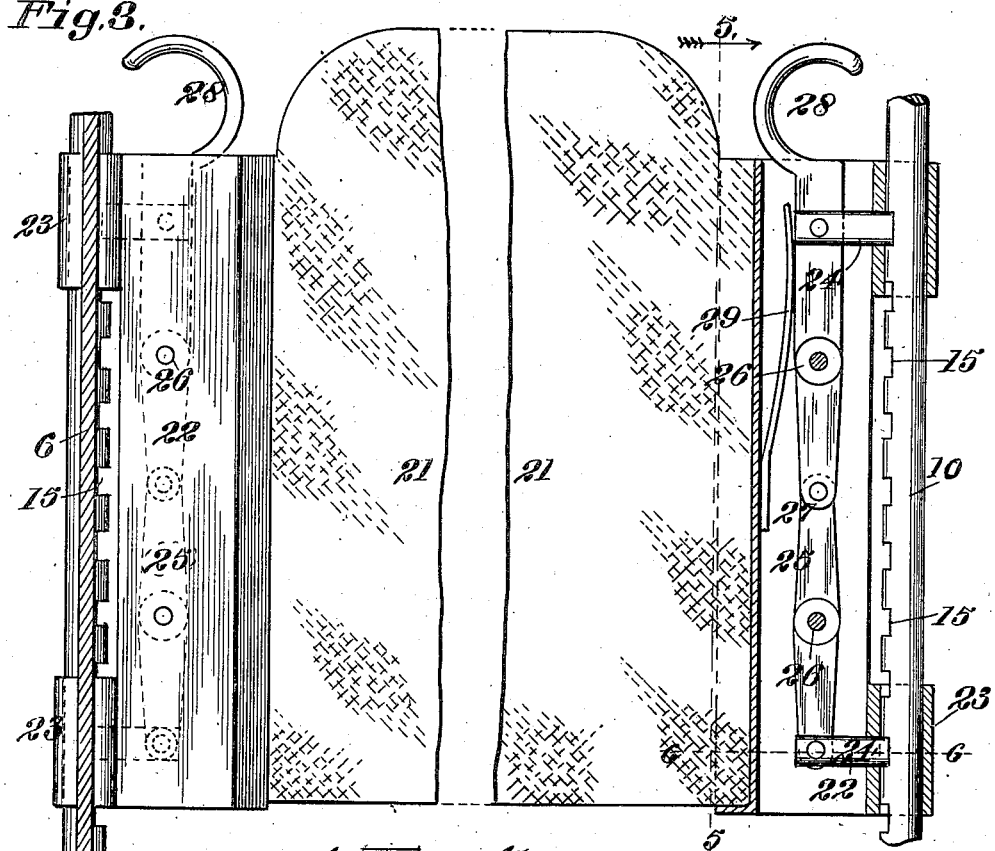
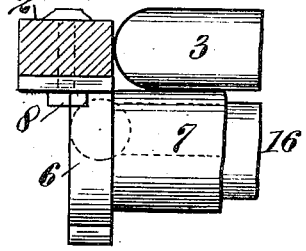
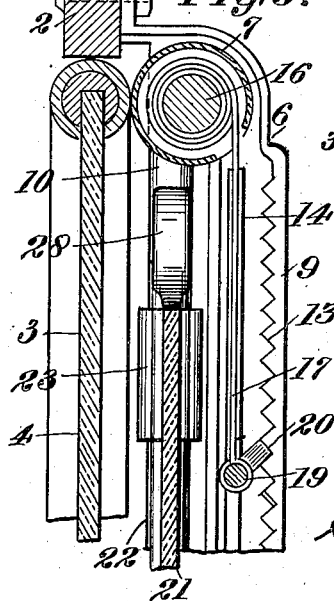
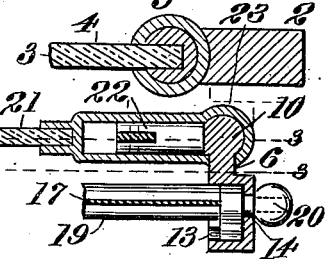
Inventor.
George N. Hein,
By Cicero Totten
Attorneys.

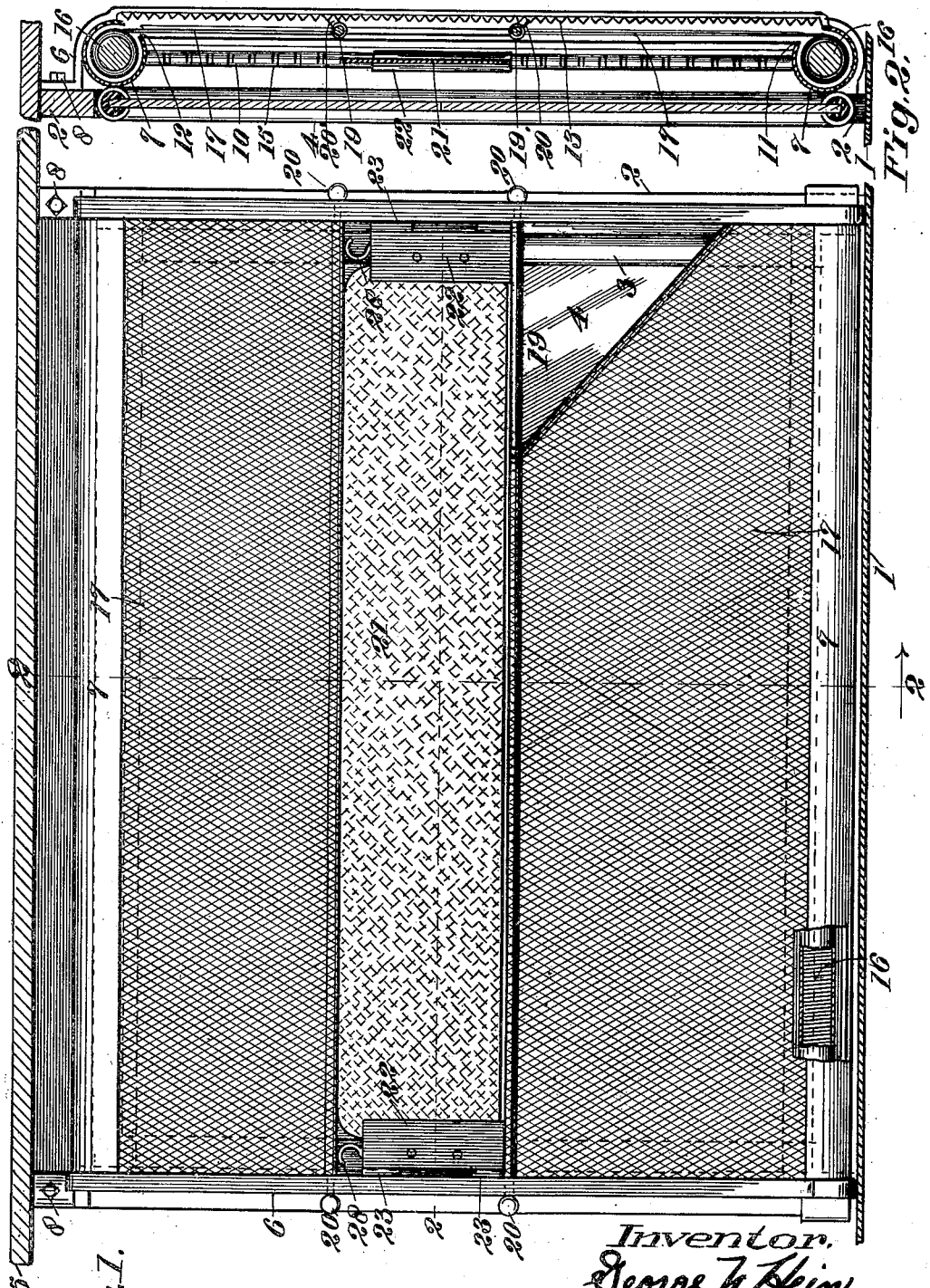

Patented Jan. 9, 1923.

1,441,501

UNITED STATES PATENT OFFICE.

GEORGE N. HEIN, OF SAN FRANCISCO, CALIFORNIA.

VEHICLE WINDSHIELD ATTACHMENT.

Application filed April 26, 1922. Serial No. 556,787.

*To all whom it may concern:*

Be it known that I, GEORGE N. HEIN, a citizen of the United States, residing at the city and county of San Francisco and State of California, have invented certain new and useful Improvements in Vehicle Windshield Attachments, of which the following is a specification.

This invention relates to improvements in wind shields for motor vehicles whereby the operator is enabled to obtain clear driving vision under adverse conditions, as, for example, when driving against the sun.

This invention has for its principal object to incorporate in combination with a vehicle wind shield a translucent member extending transversely of the shield and adapted for holding in any adjusted position vertically thereof to afford a member through which the driver may view the road without the blinding effect of the sun's rays or reflected light.

Another object is to provide in connection with said translucent member a pair of opaque curtains, one movable respectively from the upper and lower edge of the shield, adapting the curtains for use in excluding the light and affording a driving opening of the desired width and position transversely of the wind shield.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more clearly comprehend the invention, reference is directed to the accompanying drawings, wherein—

Fig. 1 is a view in rear elevation of the preferred embodiment of my invention.

Fig. 2 is a vertical sectional view, taken on line 2—2 of Fig. 1.

Fig. 3 is a view in detail of the translucent member, illustrating the guides therefor, and the member retaining means cooperating with the guides.

Fig. 4 is a sectional view on line 4—4 of Fig. 5.

Fig. 5 is a broken vertical sectional view taken on line 5—5 of Fig. 3, illustrating particularly the stop for the upper curtain.

Fig. 6 is a sectional view of one of the locking pins taken on line 6—6 of Fig. 3.

Fig. 7 is a transverse sectional view of the guides for the translucent member and opaque curtains.

Referring more particularly to the drawings, wherein like characters designate corresponding parts—1 indicates the cowl of a vehicle, upwardly from which extend the wind shield standards 2 which mount the conventional wind shield 3 containing the transparent glass surface 4. The vehicle top 5 rests in any suitable manner on the upper ends of the members 3.

Extending vertically of the inner surfaces of the members 3 are the guide frames 6 connected at their top and bottom by the roller concealing shells 7, said frames being secured in position at their upper end by the bolts 8 and at their lower end by similar means, not illustrated. Each frame comprises a pair of vertical guides 9 and 10, the guide 9 being of channel construction and communicating at its opposite ends with respective openings 11 and 12 of the curtain concealing shells 7. The rear wall of the guide 9 on its inner surface is toothed, as at 13, and the outer wall of said guide is slotted as at 14. The guides 10 with each of which the hangers for the translucent members are associated, are preferably circular in cross section and are formed on their inner surfaces to lie opposite each other with inwardly cut portions or notches 15.

Extending transversely across the top and bottom of the wind shield 1, within each member 7, are the conventional spring shade rollers 16, around which are mounted to roll opaque curtains 17, the free edges 18 of which carry stiffening rods 19, the ball ends 20 thereof operating in the slots 14.

The stiffening rods 19, within each guide 9, carry a pawl 20 for coacting with the racks 13 to retain the shade in its adjusted position. The pawls are adapted for releasing from their engaged racks by a slight axial rotation of the rods 19 in a direction inwardly toward the free edge of the respective curtains. A translucent member 21, preferably of glass and of an amber color extends transversely between the guides 10, and the same is preferably of a relatively narrow width, as illustrated in the drawings. The glass at each end carries a hanger or mounting 22 in the form of a shell provided on its edge with tubular guides 23, one at the top and bottom edge, and said pairs of guides associated with each hanger, are adapted for receiving one of the vertical guides 10, as in Fig. 3.

To retain the translucent member in its adjusted position transversely across the shield, each hanger is provided with a pair of releasable locking pins 24 carried at the free ends of the aligned toggle links 25, fulcrumed as at 26 and pivotally connected together, at their adjacent ends, as at 27. The upper link of each pair is formed with a finger grip 28 and a spring 29 normally actuates said links to force said locking pins 24 outwardly into engagement with the notches 15.

It will be apparent that this construction permits the operator to use the member 21 independently of the curtains or in combination with the curtains; also admits of the positioning of the member 21 transversely of the wind shield at any desired height, and enables the use of the curtains independently of each other or together.

In the present embodiment, it will be observed that the upper right hand corner of the lower curtain 17 is cut at an angle providing a sight opening 30 which enables the driver, in left hand drive cars, to observe any one stepping from the curb toward the vehicle. It is obvious that this sight opening 30 may be provided in either corner of the lower curtain in accordance with the position of the driver of the machine on which the installation is made.

I claim:—

1. In combination with a transparent vehicle wind shield, a vertical guide at each side thereof, a translucent member extending transversely of said shield, supports connected with the ends thereof and cooperating with said guides, whereby said member is capable of vertical adjustment on the wind shield, releasable means for maintaining said member in its adjusted position on said guides, and a pair of opaque curtains movable vertically in their opposite directions over one face of the shield, independently of each other and of said translucent member, whereby the edges of said curtains are capable of movement to afford a sight opening variable as to width and position transversely of the wind shield.

2. In combination with a vehicle cowl, a vehicle wind shield carried thereby and rising therefrom, a pair of guides at each side thereof, a translucent member extending transversely of the shield and adjustably mounted vertically of the shield on corresponding guides of each pair, an opaque curtain extending transversely of the lower edge of the shield and movable vertically thereover, a spring roller for mounting the curtain, and means carried by the free edge of the curtain for co-operating with their corresponding guides of the pair, whereby the curtain is capable of adjustment vertically of the wind shield independently of said translucent member.

3. In combination with a vehicle cowl, a vehicle wind shield carried thereby and rising therefrom, a pair of guides at each side thereof, a translucent member extending transversely of the shield and adjustably mounted vertically of the shield on corresponding guides of each pair, an opaque curtain extending transversely of the upper edge of the shield, and movable vertically thereover, a spring roller for mounting the curtain, and means carried by the free edge of the curtain for cooperating with their corresponding guides of the pair, whereby the curtain is capable of adjustment vertically of the wind shield independently of said translucent member.

4. In combination with a transparent vehicle wind shield, a vertical guide at each side thereof, a pair of opaque curtains movable vertically in opposite directions over one face of the shield independently of each other to afford a driving opening through the shield of variable width and position transversely of the shield, one of said curtains at its free edge being cut away at its corner, substantially as described.

In testimony whereof I have signed my name to this specification.

GEORGE N. HEIN.